United States Patent
Takaoka (10) Patent No.: US 6,674,466 B1
(45) Date of Patent: Jan. 6, 2004

(54) IMAGE PROCESSING APPARATUS UTILIZING LIGHT DISTRIBUTION CHARACTERISTICS OF AN ELECTRONIC FLASH (75) Inventor: Naoki Takaoka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/314,017

(22) Filed: May 19, 1999

(30) Foreign Application Priority Data

May 21, 1998 (JP) .......................................... 10-139440

(51) Int. Cl.[7] ................................................ H04N 9/73
(52) U.S. Cl. ....................... 348/224.1; 348/96; 358/506
(58) Field of Search ........................... 348/223.1, 224.1, 348/362, 370, 371, 96, 97, 98, 207.99; 396/167; 358/505, 506, 513; 355/41, 38

(56) References Cited

U.S. PATENT DOCUMENTS

| RE35,877 E | * | 8/1998 | Takagi | ........................ 396/157 |
| 5,838,364 A | * | 11/1998 | Ishibe et al. | ................... 348/96 |
| 5,889,578 A | * | 3/1999 | Jamzadeh | ..................... 355/41 |
| 6,137,957 A | * | 10/2000 | Kobayashi et al. | ............ 396/60 |
| 6,507,667 B1 | * | 1/2003 | Hsieh et al. | ................ 382/167 |

* cited by examiner

Primary Examiner—Tuan Ho
(74) Attorney, Agent, or Firm—Birch, Stewart, Kolasch & Birch, LLP (57) ABSTRACT The present invention provides an image processing apparatus for reducing the light-dark contrast between a main subject and a background when an image photographed by a camera or the like using an electronic flash is read optically. An image portion corresponding to a wall as a background, where the light amount is reduced, and an image portion corresponding to a person are separated from each other. Only the wall image portion is sampled, the decreased light amount thereof is corrected (addition is carried out) on the basis of the photographing distance to the wall and the light distribution characteristics of the electronic flash, and the light-darkness contrast between the wall image portion and the main subject image portion can be reduced. As a result, image quality can be improved, and an appropriate photographic image can be taken even with an inexpensive and simple camera such as an LF.

10 Claims, 8 Drawing Sheets

IMAGE PROCESSING APPARATUS UTILIZING LIGHT DISTRIBUTION CHARACTERISTICS OF AN ELECTRONIC FLASH

BACKGROUND OF THE INVENTION

1. Field of the Invention

The present invention relates to an image processing apparatus for obtaining image data for outputting, by carrying out predetermined image processing of image data obtained by optically reading an image recorded on a film.

2. Description of the Related Art

In recent years, a technique is known in which frame images recorded on a photographic film are optically read by a reading sensor such as a CCD (charge coupled device) or the like, image processing such as enlargement and/or contraction, various corrections, or the like is performed with respect to digital image data obtained from the aforementioned reading, and an image is thereby formed on a recording material by using laser light which is modulated on the basis of digital image data for which the image processing has been completed.

In such a technique in which frame images are digitally read by the reading sensor such as the CCD or the like as described above, in order to realize highly accurate image reading, frame images are read preparatorily (so-called prescanning), reading conditions in accordance with densities or the like of frame images (for example, amount of light to be irradiated onto the frame images, time during which charge is accumulated in the CCD or the like) are determined, and the frame images are again read on the basis of the determined reading conditions (so-called fine scanning).

At the time of photographing using a camera, there are some cases in which an electronic flash is used. If photographing is carried out having emitted the electronic flash, although the light amount can be forced to increase, because the electronic flash has light distribution characteristics (distribution of a light amount), there is a tendency in which the light-dark contrast between the central portion and the peripheral portion of the image increases such that a main subject (a person) located at the center of the image becomes whitish while the peripheral background becomes dark, for example.

In this case, if the electronic flash is of a type to be loaded into a comparatively expensive camera, light amount can be adjusted, a light diffusing plate can be placed so as to make a light amount distribution even, and indirect lighting can be carried out.

However, especially in the case of an LF (lenticular film: film equipped with lens), since the electronic flash is designed to increase the light amount irradiated onto the main subject (because the light amount is concentrated at the image central portion, where the probability is high that the main subject is located thereat), a large difference is thereby caused between light distribution characteristics corresponding to the photographing distance between a photographer and the main subject and light distribution characteristics corresponding to the photographing distance between the photographer and the background.

Figure 6:
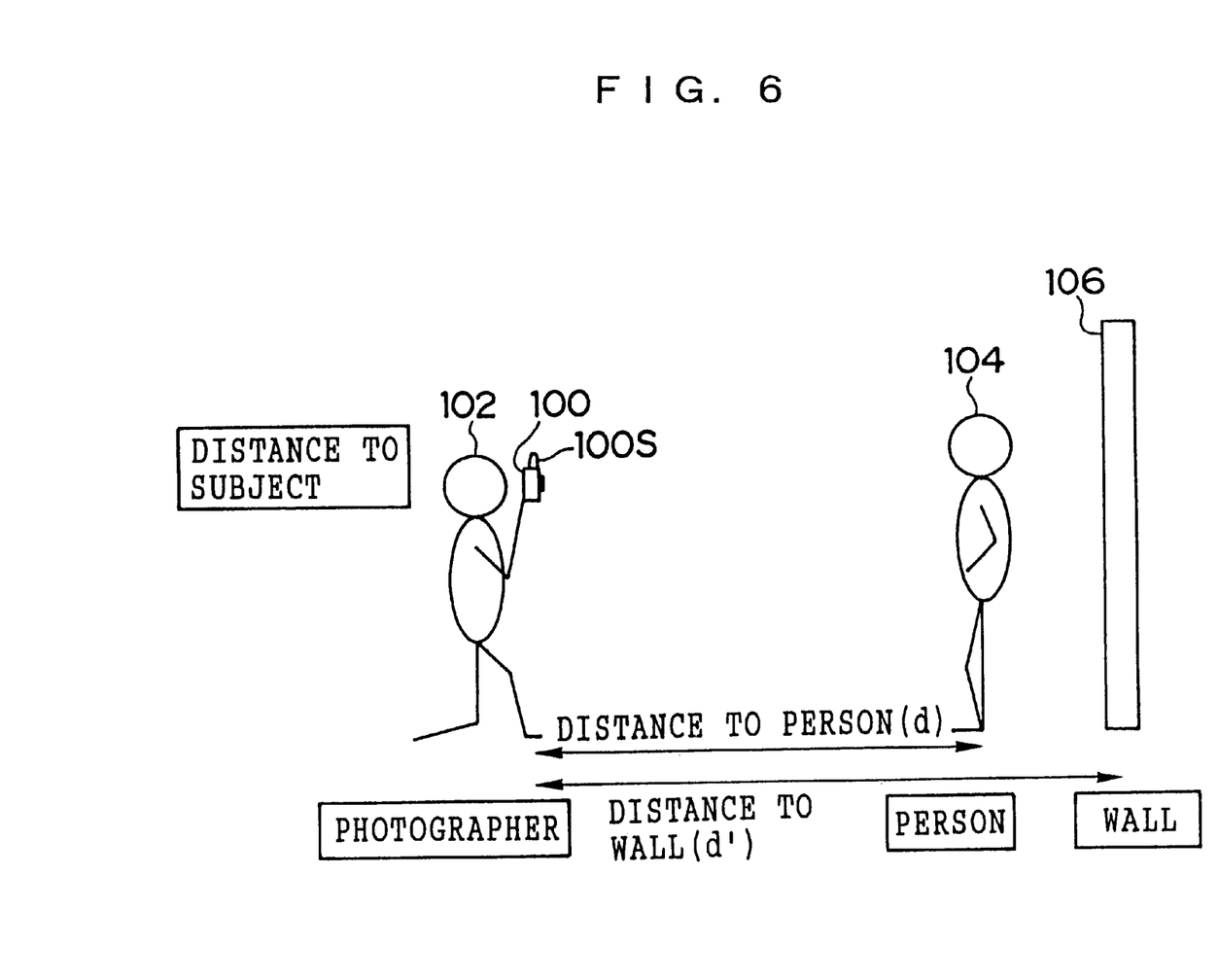
FIG. 6 is a side view illustrating a state in which a photographer is taking a picture using an LF and an electronic flash.

FIG. 6 is a side view of a scene where a photographer 102 is taking a picture of a subject (person) 104 by locating the subject 104 as a center. A wall 106 is placed behind the subject 104.

In this case, a photographing distance d from the photographer 102 to the subject 104 and a photographing distance d' from the photographer 102 to the wall 106 have a relationship of d<d'.

Figure 7A:
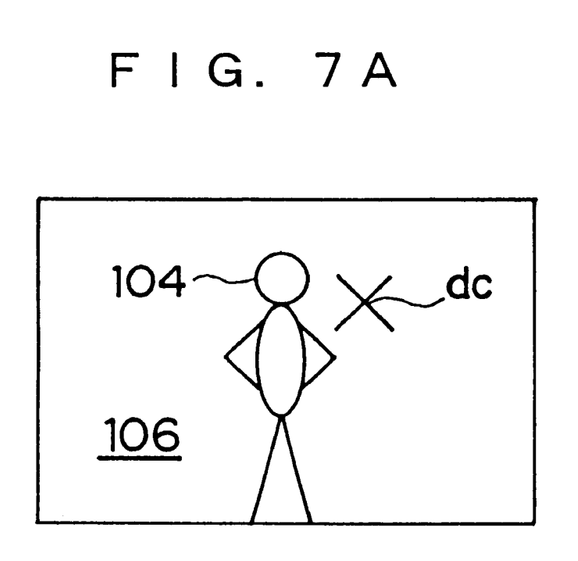
FIG. 7A is a front view showing that the center of light, which is transmitted from the electronic flash to the image which has been photographed in the state of FIG. 6, is positioned near a person.
Figure 7B:
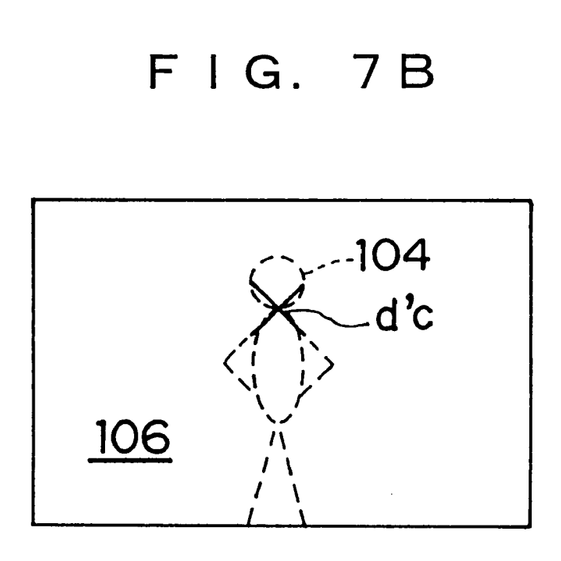
FIG. 7B is a front view showing the center of light, which is transmitted from the electronic flash to the image which has been photographed in the state of FIG. 6, is positioned near a wall.

When the photographer 102 takes a picture, as is shown in FIG. 7A, the center of light distribution characteristics of an electronic flash 100S at a position of the subject 104 is located near an end of a shoulder of the subject 104 (see a point dc) while, as is shown in FIG. 7B, the center of the light distribution characteristics of the electronic flash 100S at a position of the wall 106 is located behind the neck of the subject 104 (see a point d'c). Namely, as the photographing distance becomes longer, the center of the light distribution characteristics of the electronic flash 100S moves closer to the center of the image photographed.

Figure 8A:
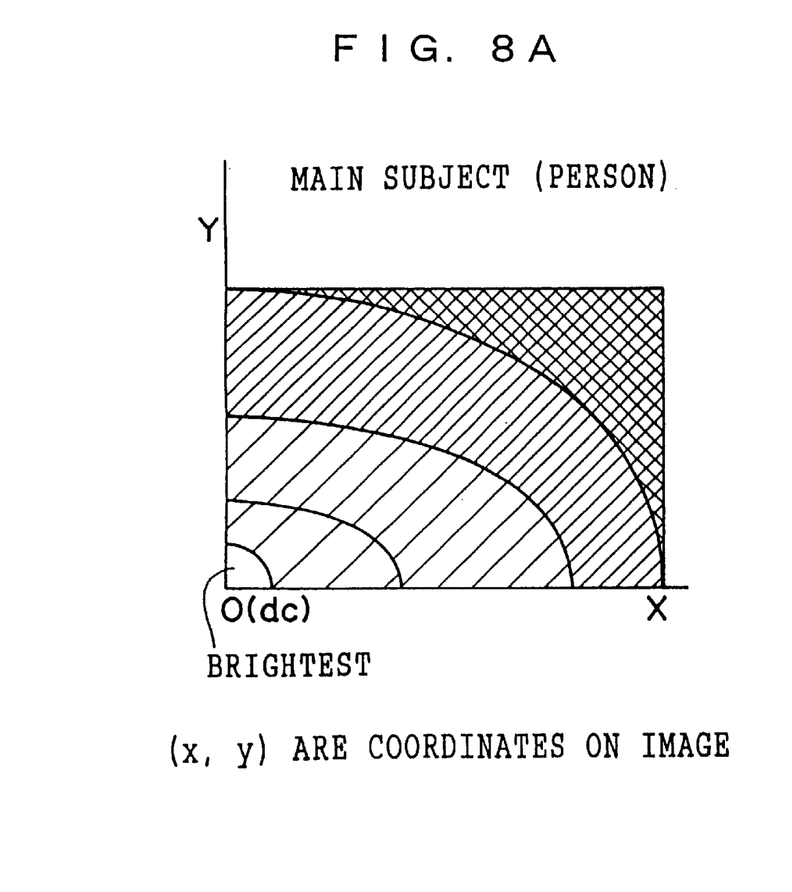
FIG. 8A is a view of light distribution characteristics in FIG. 7A.
Figure 8B:
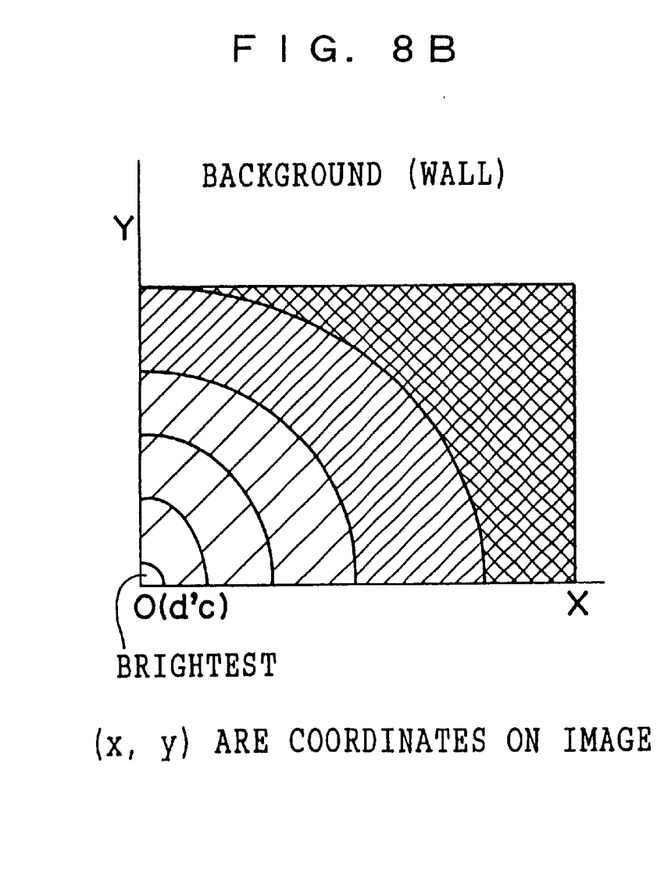
FIG. 8B is a view of light distribution characteristics in FIG. 7B.

When the light distribution characteristics at the position of the subject 104, which is shown in the graph of FIG. 8A, and the light distribution characteristics at the position of the wall 106, which is shown in the graph of FIG. 8B, are compared to each other, it can be clearly seen that the light distribution characteristics at the position of the wall 106 are darker.

If there is such a light-dark contrast between the main subject and the background of an image, the image is not preferable.

SUMMARY OF THE INVENTION

In consideration of the aforementioned facts, it is an object of the present invention to provide an image processing apparatus that can reduce the light-darkness contrast between the main subject and the background when the image, which is photographed by a camera by using the electronic flash, is read optically.

A first aspect of the present invention is an image processing apparatus for obtaining image data for outputting, by carrying out predetermined image processing of image data, comprising: photographing information obtaining means that obtains light distribution characteristics of an electronic flash, corresponding to a photographing distance; computing means that reads the light distribution characteristics of the electronic flash, and computes a light amount adjusting amount of the image on the basis of the light distribution characteristics read; and correcting means that corrects the image on the basis of the light amount adjusting amount which is computed by the computing means.

In accordance with the first aspect of the present invention, the photographic information obtaining means obtains the light distribution characteristics of the electronic flash corresponding to the photographing distance. The computing means carries out light amount correction on the basis of the light distribution characteristics obtained.

When an image is photographed using the electronic flash, light distribution characteristics of the electronic flash vary in accordance with a photographing distance. Especially with an electronic flash having light distribution characteristics whose center is placed at the main subject of the image, the light amount of the background tends to decrease. Therefore, a feeling of visual disorder which is caused by the light amount difference between the main subject and the background can be mitigated by correcting the decreased light amount of the background through the aforementioned computation.

A second aspect of the present invention is an image processing apparatus for obtaining image data for outputting, by carrying out predetermined image processing of image data, comprising: photographing information obtaining means that obtains photographing information including light distribution characteristics of the electronic flash and the photographing distance of a camera; image separating means that separates the image into a main subject image portion and a background image portion; computing means that reads the light distribution characteristics of the electronic flash corresponding to the photographing distance to each of the main subject image portion and the background image portion, which have been separated from each other by the separating means, and computes a light amount adjusting amount of each of the main subject image portion and the background image portion on the basis of the light distribution characteristics thereof; correcting means that corrects each of the main subject image portion and the background image portion on the basis of the light amount adjusting amount which has been computed by the computing means; and combination means that combines the main subject image portion and the background image portion which have been corrected by the correcting means.

In accordance with the second aspect of the present invention, after the photographed image has been read optically, it is converted to, for example, a digital image. Therefore, it becomes easy to separate the main subject image portion and the background image portion from each other. As a result, the main subject image portion and the background image portion are corrected independently of each other (this includes the correction of only the background) thereby allowing the image processing apparatus to carry out more appropriate correction.

A third aspect of the present invention is an image processing apparatus according to the second aspect of the present invention, further comprising: density difference controlling means which controls the difference between densities of the contour of each of the main subject image portion and the background image portion when the main subject image portion and the background image portion are combined, to a predetermined value or less.

In accordance with the third aspect of the present invention, at the time of the combination of the above-described separated image portions, since the image processing apparatus of the present invention further comprises the density difference controlling means that controls the difference between densities of the contours of the main subject image portion and the background image portion to a predetermined density value or less, connecting portions of the combined images can be made smoother. For example, a weighting process is performed on the density of pixels adjacent to each contour of the image portions by the density difference controlling means, thus inhibiting extreme changes in the density.

A fourth aspect of the present invention is an image processing apparatus according to any one of the first to third aspects of the present invention, wherein the correction means includes setting means which sets a ratio with which correction can be substantially carried out in accordance with a density for each pixel when the image is expressed as a plurality of pixels.

A fifth aspect of the present invention is an image processing apparatus according to the fourth aspect of the present invention, wherein the ratio is set in accordance with a predetermined characteristics curve such that the ratio decreases as the density of the pixels becomes close to the base density of a negative image, the ratio increases as the density thereof becomes farther from the base density of the negative image, and the ratio continuously changes when the density is at the intermediate of the base density of the negative image.

In accordance with the fourth and fifth aspects of the present invention, in the photographic film (in a case of a negative film), if correction is performed on pixels whose density is close to the base density of the negative image, an unnatural picture pattern is formed. Accordingly, it should be noted that correction is not performed on the pixels whose density is close to the base density. Instead, the farther the density of a pixel is from the base density of the negative image, the more correction is performed. As a result, it becomes possible to remove the difference between densities of the main subject image portion and the background image portion without causing unnaturalness to the image as a whole.

In a case of a full-color image, the above-described correction can be performed on a color separation of R, G, and B, or, for example, R, G, and B colors can be corrected simultaneously by sampling illumination signals thereof.

DETAILED DESCRIPTION OF THE PREFERRED EMBODIMENTS

Figure 1:
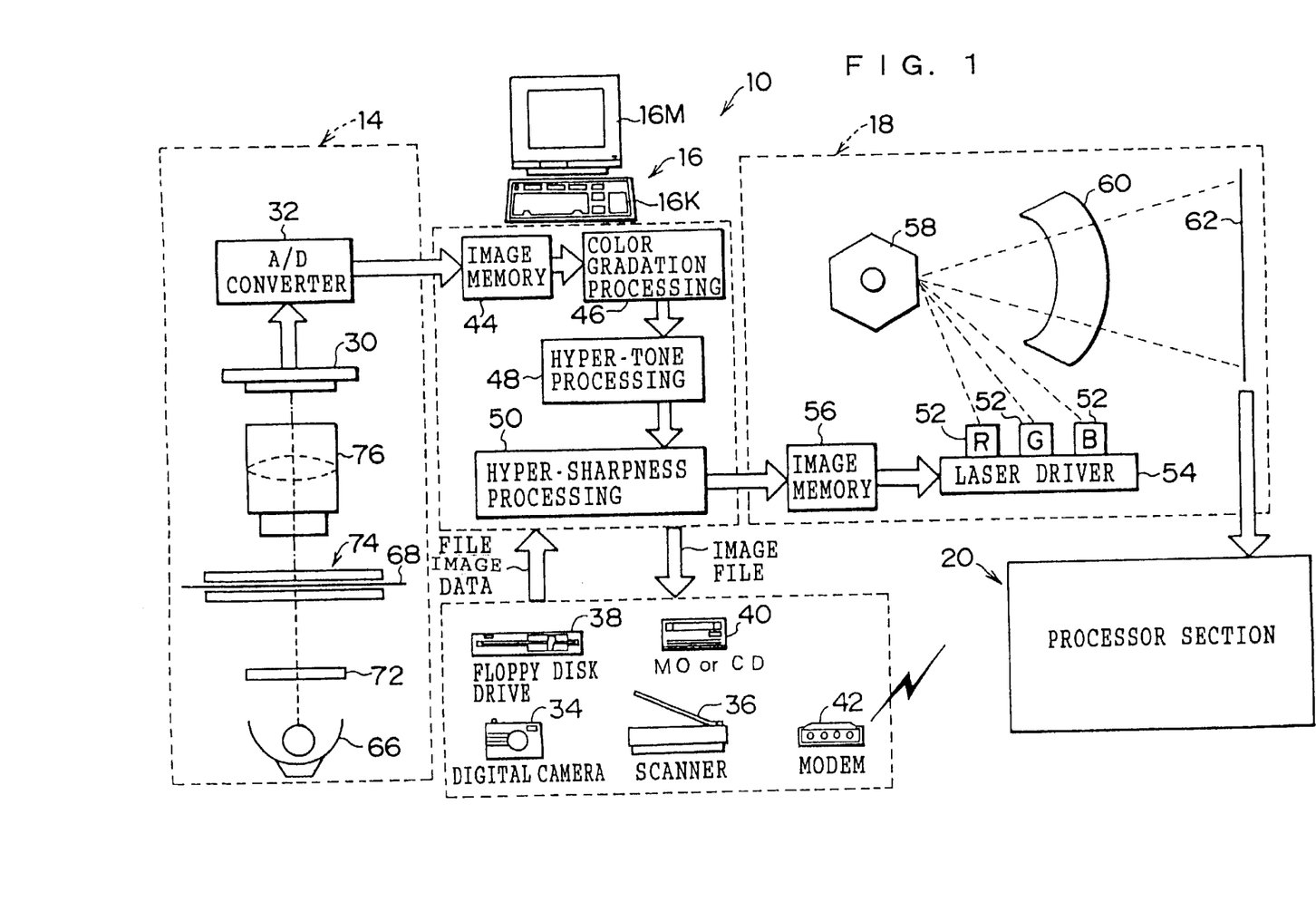
FIG. 1 is a schematic structural view of a digital lab system according to an embodiment of the present invention.
Figure 2:
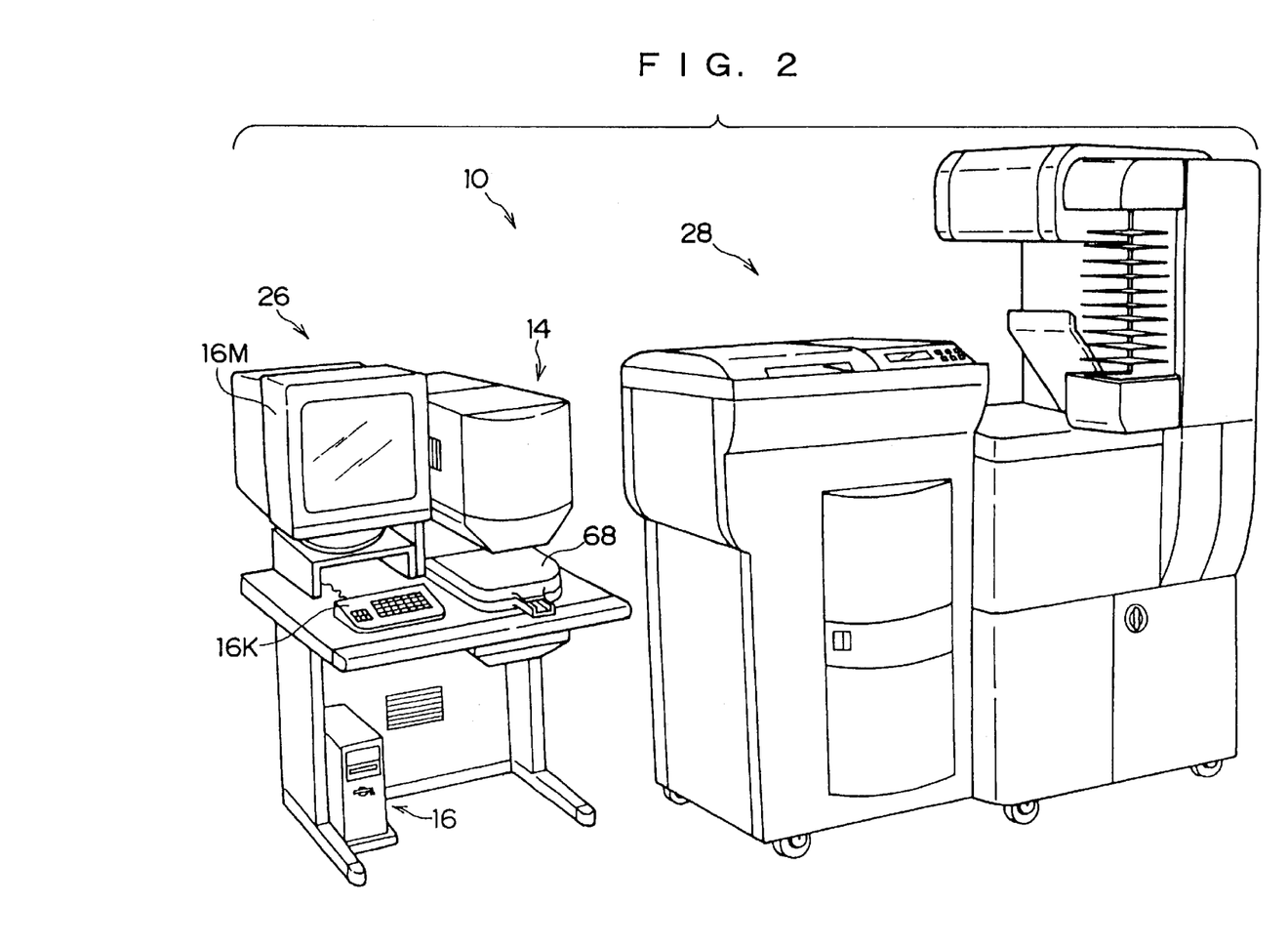
FIG. 2 is an external view of the digital lab system according to the present embodiment.

A schematic structure of a digital lab system 10 according to an embodiment of the present invention is shown in FIGS. 1 and 2.

As shown in FIG. 1, this digital lab system 10 comprises a line CCD scanner 14, an image processing section 16, a laser printer section 18, and a processor section 20. The line CCD scanner 14 and the image processing section 16 are integrated with each other as an input section 26 which is shown in FIG. 2. The laser printer section 18 and the processor section 20 are integrated with each other as an output section 28 which is also shown in FIG. 2.

The line CCD scanner 14 is used to read frame images which are recorded on a photographic film such as a negative film, a reversal film or the like and is able to read frame images of, for example, a 135-size photographic film, a 110-size photographic film, a photographic film on which a transparent magnetic layer is formed (a 240-size photographic film: a so-called APS film), and 120-size and 220-size (Brownie size) photographic films. The line CCD scanner 14 reads the frame images that are subject to be read, by using a line CCD 30. After the read frame images have been converted from analog to digital (A/D) at an A/D conversion section 32, image data is output to the image processing section 16.

In the present embodiment, the digital lab system 10 in a case in which, for example, a 240-size photographic film 68 (APS film) is applied will be explained.

The image processing section 16 is structured in such a manner as described below. Image data output from the line CCD scanner 14 (scanned image data) is input to the image processing section 16, and image data obtained by photographing using a digital camera 34 or the like, image data obtained by reading an original (e.g. a reflection copy or the like) using a scanner 36 (a flat-bed type scanner), image data generated by another computer and recorded in a floppy disc drive 38, an MO (magneto-optical disk) or CD drive 40, and communication image data which is received through a modem 42 or the like (which is referred to as file image data hereinafter) can also be input thereto from the external devices The image processing section 16 stores the input image data in an image memory 44, carries out various types of image processing at a color gradation processing section 46, a hyper-tone processing section 48, a hyper-sharpness processing section 50, and the like, and then outputs the image-processed image data as image data for recording, to the laser printer section 18. The image processing section 16 can also output the image-processed image data as an image file, to the external devices (for example, outputting to a storage medium such as an FD, MO, CD or the like or transmitting to another information processing equipment through communication lines).

The laser printer section 18 has laser sources 52 of R, G, and B, and controls a laser driver 54 so as to irradiate laser light onto a printing paper 62, which is modulated on the basis of image data for recording (which is once recorded in an image memory 56) which is input from the image processing section 16. In the present embodiment, an image is recorded onto the printing paper 62 through scanning exposure using an optical system in which a polygon mirror 58 and an fθ lens 60 are mainly employed. Further, in the processor section 20, each of a color developing processing, bleaching/fixing processing, rinsing processing, and drying processing is applied to the printing paper 62 on which an image has been formed by scanning exposure at the laser printer section 18. As a result, image is formed on the printing paper 62.

(Structure of Line CCD Scanner)

A description of the structure of the line CCD scanner 14 will be given hereinafter. A schematic structure of an optical system of the line CCD scanner 14 is shown in FIG. 1. This optical system has a light source 66 which irradiates light onto a photographic film 68, and a light diffusion plate 72 that diffuses light irradiated onto the photographic film 68 into diffused light is disposed at the light emission side of the light source 66.

The photographic film 68 is conveyed by a film carrier 74 (which is located toward the side on which the light diffusing plate 72 is disposed, with respect to the photographic film 68) in such a manner that an image plane of a frame image is orthogonal to the optical axis of the light source 66.

A lens unit 76, which focuses light transmitted through frame images, and the line CCD 30, are disposed in that order along the optical axis at the side of the photographic film 68 opposite to the light source 66. Further, although a single lens is illustrated as the lens unit 76, the lens unit 76 is actually a zoom lens formed by a plurality of lenses. Moreover, a SELFOC lens can be used as the lens unit 76. In this case, it is desirable to place respective end surfaces of the SELFOC lens so as to be as close to as possible to the photographic film 68 and the line CCD 30.

The line CCD 30 has a plurality of CCD cells which are arranged in a row in a widthwise direction of the photographic film 68 (in a direction orthogonal to the direction the photographic film 68 is conveyed), and has three lines of sensing portions which have an electronic shutter mechanism and which are provided so as to be spaced apart from one another and parallel to one another. One of R, G, and B color separation filters is attached to each of the sensing portions on the side thereof upon which light is incident (a so-called 3 line color CCD). The line CCD 30 is disposed such that a light receiving surface of each of the sensing portions corresponds to a focus point position of the lens unit 76.

Although it is not illustrated, a shutter is provided between the line CCD 30 and the lens unit 76.

(Structure of Control System of Image Processing Section 16)

Figure 3:
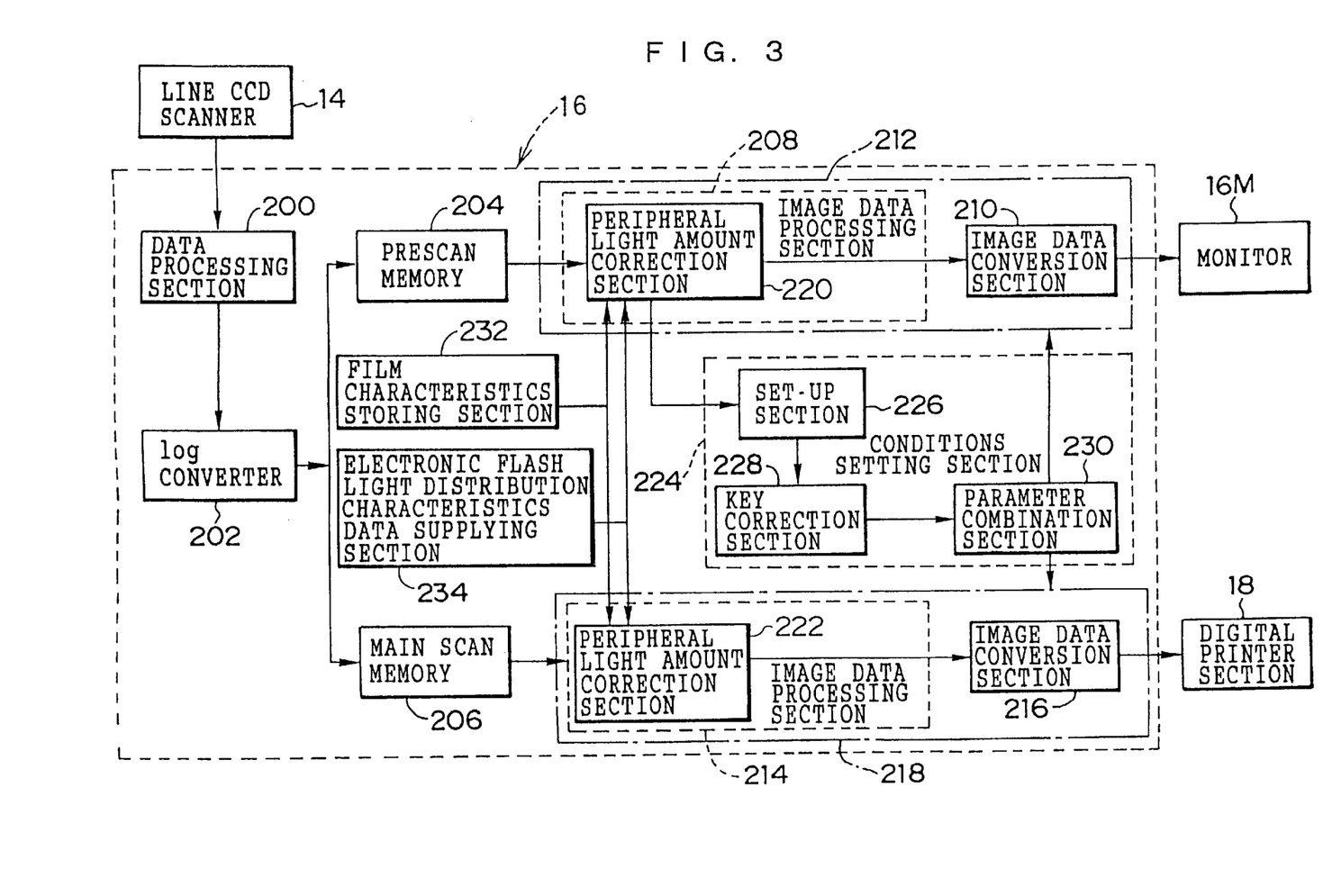
FIG. 3 is a block diagram of a control system in an image processing section.

A detailed block diagram of a control system for performing each of image processings in the image processing section 16, which is shown in FIG. 1 and which mainly comprises an image memory 44, a color gradation processing section 46, a hyper-tone processing section 48, and a hyper-sharpness processing section 50, is shown in FIG. 3.

Each of R, G, and B digital signals outputted from the line CCD scanner 14 undergoes a predetermined data processing such as darkness correction, defective pixels correction, or shading correction at a data processing section 200, and is then converted to digital image data (density data) at a Log converter 202. Prescan data is stored in a prescan memory 204, and main scan data is stored in a main scan memory 206.

The prescan data stored in the prescan memory 204 is sent to a prescan processing section 212 structured by an image data processing section 208 and an image data conversion section 210. On the other hand, the main scan data stored in the main scan memory 206 is sent to a main scan processing section 218 structured by an image data processing section 214 and an image data conversion section 216.

The prescan processing section 212 and the main scan processing section 218 carry out a correction or the like of the image on the basis of the electronic flash light distribution characteristics at the time of the photographing using the electronic flash.

The image data processing section 208 and the image data processing section 214 perform each of image processings such as color balance adjustment, contrast adjustment (color gradation processing), brightness correction, saturation correction (hyper-tone processing), and hyper-sharpness processing by a known method such as look up table (LUT) or matrix (MTX) computation.

Further, there are provided peripheral light amount correction sections 220 and 222 in the image data processing sections 208 and 214 for correcting the light amount at the periphery (the background) of the main subject of the image before each of the aforementioned adjustments and corrections is carried out.

In the case in which the electronic flash is used at the time of the photographing with a camera, the peripheral light amount correction sections 220 and 222 correct the decrease in the light amount of the periphery (background) with respect to the main subject (person), on the basis of the light distribution characteristics of the electronic flash and the photographing distance. Further, a detailed description of the light amount correction at the peripheral light amount correction sections 220 and 222 will be given later.

The image data conversion section 210 for prescanning converts the image data, which is processed by the image data processing section 208, to image data for display, which is to be displayed on a monitor 16M on the basis of 3D-LUT. On the other hand, the image data conversion section 216 for main scanning converts image data, which is processed by the image data processing section 214, to image data for printing at the laser printer section 18 (the digital printer section) on the basis of the 3D-LUT. Further, although the image data for display and the image data for printing have different colorimetric systems, they are made to correspond to each other by various corrections described below.

A conditions setting section 224 is connected to the prescan processing section 212 and the main scan processing section 218.

The conditions setting section 224 is structured by a set-up section 226, a key correction section 228, and a parameter combination section 230.

The set-up section 226 sets main scan reading conditions by using prescan data, supplies the line CCD scanner 14 with the main scan reading conditions, computes image processing conditions of the prescan processing section 212 and the main scan processing section 218, and supplies the parameter combination section 230 with the image processing conditions thus computed.

The key correction section 228 computes an adjusting amount of the image processing conditions in accordance with various instructions that are input through keys set on a keyboard 16K (for adjusting density, color, contrast, sharpness, or saturation) or with a mouse, and supplies the parameter combination section 230 with the adjusting amount.

The parameter combination section 230 supplies the image data processing section 208 for prescanning and the image data processing section 214 for main scanning with image processing conditions received from the set-up section 226 and the key correction section 228 which have been described above, and corrects or resets the image processing conditions.

A film characteristics storing section 232 is also connected to the conditions setting section 224, and stores various film characteristics therein.

A Film characteristics are gradation characteristics (γ characteristics) and are generally expressed by the curve in which density changes three-dimensionally in accordance with an exposure amount. Further, this point is a known technique, and a detailed description thereof is omitted.

As for specification of a film type, in the case of the present embodiment, information about the film type is recorded on the magnetic recording layer of the APS film and is readable by the magnetic head when the film is conveyed by the film carrier 74 inside the line CCD scanner 14. In the case of a 135 size film, the film type can be determined from the configuration of the film (whose width-wise direction end portions have perforations with a relatively short spacing), or information about the film type can be input by the operator through the keyboard.

An electronic flash light distribution characteristics data supplying section 234 is also connected to the conditions setting section 224. The electronic flash light distribution characteristics data supplying section 234 obtains information for determining the type of the electronic flash used when the image is photographed by a camera, and supplies the peripheral light amount correction sections 220 and 222 with the light distribution characteristics corresponding to the electronic flash type information thus obtained.

The electronic flash light distribution characteristics data supplying section 234 has a memory (tables). The memory stores light distribution characteristics of various electronic flashes corresponding to various cameras (that include all types such as an electronic flash applied to the LF, an electronic flash built into a general camera, and an electronic flash equipped later, but in the present embodiment, the electronic flash for the LF is a main target for correction) therein. Because the light distribution characteristics vary in accordance with the length of a photographing distance, the aforementioned memory stores a plurality of light distribution characteristics in accordance with the photographic distance for each of the electronic flashes.

Light distribution characteristics when the image is photographed by using the LF 100 in the state shown in FIG. 6 are shown in FIGS. 8A and 8B. In FIG. 6, the state in which the main subject (person) 104 stands slightly to the front of the wall 106 is shown. In this figure, the photographing distance to the main subject 104 (from the photographer 102) is d, the photographing distance to the wall 106 is d', and there is a relationship of d<d' (see the paragraph of "Description of the Related Art" in this specification). Since light distribution characteristics of the electronic flash vary due to the difference between these photographing distances (see FIGS. 8A and 8B), light distribution characteristics corresponding to each of photographing distances must be stored in the memory.

The electronic flash light distribution characteristics data supplying section 234 reads light distribution characteristics corresponding to the electronic flash type information and the photographing distance thus obtained, and supplies the peripheral light amount correction sections 220 and 222 with the light distribution characteristics. When the APS film is used, the photographing distance can be recorded on the magnetic recording layer thereof. Further, when the 135 size film or the like is used, the photographing distance can be optically recorded or can be stored in another recording medium.

The peripheral light amount correction sections 220 and 222 have a well-known image sampling function. Namely, the main subject image portion and the peripheral (background) portion image portion are separated from each other. Attention is focused only on the background image portion whose light amount generally decreases. The background image portion having separated from the main subject image portion is corrected, and thereafter, the main subject image portion and the background image portion thus corrected are combined with each other. Further, when the main subject image portion and the background image portion are combined with each other, the connecting portion of the main subject image portion and the background image portion can be made smoother by the contour of the main subject image portion being blurred (in other words, excessive density difference between the two image portions can be reduced). More specifically, weighting processing is carried out on the pixels corresponding to the regions of the image adjacent to the border between the two image portions.

Operation of the present embodiment will be described hereinafter.

When an operator inserts the photographic film 68 into the film carrier 74, and gives instructions to start reading the frame images using a key board 16K, the film carrier 74 begins to convey the photographic film 68. Prescanning can be performed due to this conveyance. Namely, while the photographic film 68 is conveyed at a relatively high speed, various data other than the frame images and image recording regions of the photographic film 68 is read by the line scanner 14. The read image is displayed on a monitor 16M.

At this time, the size of a frame image is recognized, and for example, in a case in which the frame image has a panoramic size, an empty portion specific to a panoramic size image (portions at both ends of the photographic film in the widthwise direction thereof) is shaded.

Reading conditions at the time of fine scanning are determined for each of the frame images on the basis of the results of prescanning for each of the frame images.

After setting the reading conditions during fine scanning for all of the frame images, the photographic film 68 is conveyed in a direction opposite to the direction of prescanning, and fine scanning is then performed for each of the frame images.

At this time, since the photographic film 68 is conveyed in the direction opposite to the direction of prescanning, fine scanning is performed from a final frame to a first frame. Since the speed of fine scanning is set to be lower than that of prescanning, fine scanning results in a reading resolution which is higher than that of prescanning. Further, at the time of prescanning, because image conditions (e.g., an aspect ratio of a photographed image, photographing conditions such as underexposure, normal exposure, over exposure, super overexposure, or the like, use or nonuse of flash photographing or the like) is recognized, the image can be read under appropriate reading conditions.

In the above description, once prescan data is stored in the prescan memory 204, the peripheral light amount correction section 220 of the prescan data processing section 212 reads this data, and carries out peripheral light amount correction. In accordance with the flow chart of FIG. 4, the peripheral light amount correction procedure will be explained hereinafter.

Figure 4:
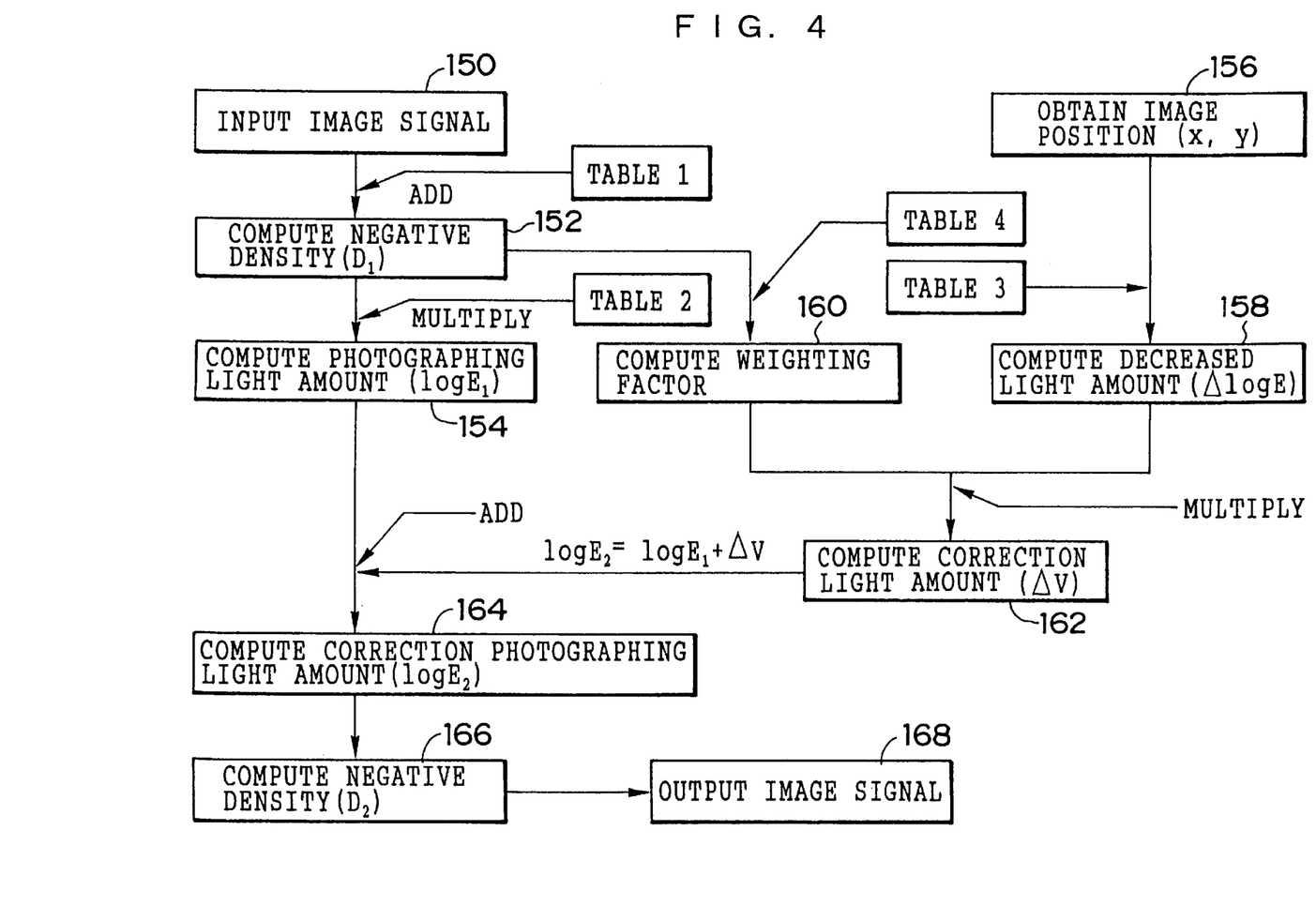
FIG. 4 is a flow chart illustrating a peripheral light amount correction procedure on the basis of light distribution characteristics of an electronic flash.

The peripheral light amount correction section 220 reads prescan data from the prescan memory 204 in step 150 and computes a density $D_1$ for each of R, G and B colors with reference to a table 1 in step 152.

In step 154, the peripheral light amount correction section 220 computes a photographing light amount log $E_1$ by using film characteristics read from a film characteristics storing section 232 with reference to a table 2.

In step 156, the peripheral light amount correction section 220 obtains coordinates (x, y) on the image to be processed, namely, obtains a region of the image separated from the main subject image portion for sampling a background as a peripheral image portion, and in step 158, computes the decreased light amount $\Delta \log E$ representing the decrease in the light amount in peripheral pixels at the aforementioned coordinates on the image, on the basis of light distribution characteristics sent from the electronic flash light distribution characteristics data supplying section 234, with reference to a table 3.

In step 160, a weighting factor k representing a correction degree of the peripheral pixels is determined with reference to a table 4.

Figure 5:
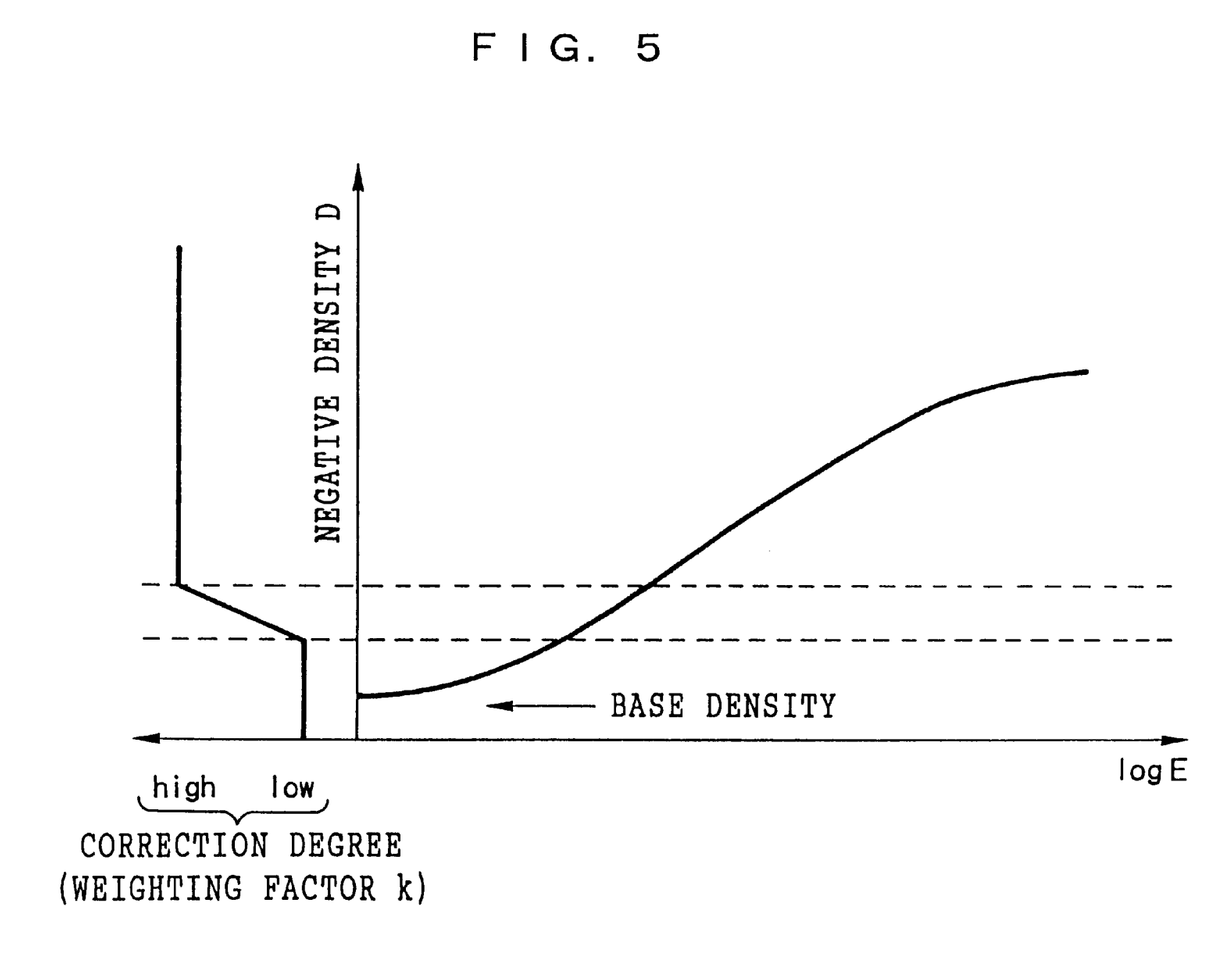
FIG. 5 is a characteristics diagram illustrating the degree of the peripheral light amount correction on the basis of image density.

As is shown in FIG. 5, while the peripheral light amount correction is not carried out on a region which is an unexposed portion of the image and whose negative density is the brightest and close to the base density (correction degree in FIG. 5 is low), it is fully carried out on a region whose density is farther from the base density (correction degree in FIG. 5 is high). The peripheral light amount correction is carried out to an intermediate degree on an intermediate region whose density is between that of the region whose correction degree is low and that of the region whose correction degree is high. Accordingly, unnatural picture patterns can be prevented from resulting from the peripheral light amount correction being performed on a region whose density is close to the base density thereby increasing the density of a peripheral portion of the region.

The peripheral light amount correction section 220 computes a correction light amount $\Delta V$ as a light amount to be corrected by multiplying the weighting factor k and the decreased light amount $\Delta \log E$ in step 162, and adds the computed correction light amount $\Delta V$ to the photographing light amount log $E_1$ and determines a correction photographing light amount log $E_2$ in step 164.

In step 166, the correction photographing light amount log $E_2$ is again converted to a negative density $D_2$ and in step 168, is outputted as an image signal.

The above description is a density correction procedure in the peripheral light amount correction section 220 for an image photographed using the electronic flash. The set-up section 226 of the conditions setting section 224 receives data for which correction by the peripheral light amount correction section 220 has been completed, forms density histograms, computes image characteristic amounts such as high light or shadow, sets main scan reading conditions, and then supplies the main scan reading conditions to the line CCD scanner 14.

The image for which the peripheral light amount correction has been completed is processed by using LUT and MTX, thereafter, supplied with necessary image processings such as sharpness and dodging, converted at the image data conversion section 210, and displayed on the monitor 16M.

The set-up section 226 sets various image processing conditions such as gradation adjustment and gray balance adjustment, and supplies image processing conditions to a parameter combination section 230.

The parameter combination section 230, having received the image processing conditions, supplies the image processing conditions to the prescan processing section 212 and the main scan processing section 218.

Main scanning is carried out substantially in the same way as prescanning. A signal output from the line CCD 30 is converted to a digital signal at the A/D converter 32, processed at the data processing section 200 of the image processing section 16, converted to main scan data at the Log converter 202, and then supplied to the main scan memory 206.

When main scan data is sent to the main scan memory 206, the data sent is read by the main scan processing section 218, undergoes image processing in the same manner as the processing in the prescan processing section 212, is converted to colorimetric system image data appropriate to the laser printer section 18 at the image data conversion section 216, and is thereby outputted.

In this way, conventionally, especially when an image is photographed using an LF 100 (see FIG. 6) having an electroic flash 100S built thereinto in a state in which the subject (person) 104 is located slightly to the front of the wall 106, there has been caused a difference between light amounts of the person 104 and the wall 106 due to the difference between light distribution characteristics of the electronic flash 100S at the person 104 and light distribution characteristics thereof at the wall 106.

In the present embodiment, the image portion of the wall 106 having a decreased light amount is separated from the image portion of the person 104, only the image portion of the wall 106 as a background is sampled, the decreased light amount is corrected (addition is carried out) on the basis of the photographing distance to the wall 106 and light distribution characteristics of the electronic flash 100S, and the difference between light amounts of the main subject image portion and the background image portion can be reduced. As a result, image quality can be improved, and reasonable photographic images can be obtained even with an inexpensive and simple camera such as the LF 100.

The present invention is not limited to application to the LF 100. Instead, it is applicable to general photographing using an electronic flash. However, a more remarkable effect can be provided in application to a camera load with an electronic flash emitting a constant light amount all the time in spite of the photographing distance, such as the LF 100.

As can be seen from the above description, the image processing apparatus according to the present invention can provide an excellent effect in that, when the image that has been photographed by a camera or the like by using the electronic flash is optically read, the light-darkness contrast between the main subject image portion and the background image portion can be reduced.

What is claimed is:

1. An image processing apparatus for obtaining image data for outputting, by carrying out predetermined image processing of image data, comprising:
    photographing information obtaining means that obtains light distribution characteristics of an electronic flash, corresponding to a photographing distance;
    computing means that reads the light distribution characteristics of the electronic flash, and computes a light amount adjusting amount of the image on the basis of said light distribution characteristics read; and
    correcting means that corrects said image on the basis of the light amount adjusting amount which is computed by said computing means.

2. An image processing apparatus for obtaining image data for outputting, by carrying out predetermined image processing of image data, comprising:
    photographing information obtaining means that obtains photographing information including light distribution characteristics of the electronic flash and the photographing distance of a camera;
    image separating means that separates said image into a main subject image portion and a background image portion;
    computing means that reads the light distribution characteristics of the electronic flash corresponding to the photographing distance to each of the main subject image portion and the background image portion, which have been separated from each other by said separating means, and computes a light amount adjusting amount of each of said main subject image portion and said background image portion on the basis of the light distribution characteristics thereof;
    correcting means that corrects each of said main subject image portion and said background image portion on the basis of the light amount adjusting amount which has been computed by said computing means; and
    combination means that combines said main subject image portion and said background image portion which have been corrected by said correcting means.

3. An image processing apparatus according to claim 2, further comprising: density difference controlling means which controls the difference between densities of the contour of each of said main subject image portion and said background image portion when said main subject image portion and said background image portion are combined, to a predetermined value or less.

4. An image processing apparatus according to claim 1, wherein said correction means includes setting means which sets a ratio with which correction can be substantially carried out in accordance with a density for each pixel when the image is expressed as a plurality of pixels.

5. An image processing apparatus according to claim 4, wherein said ratio is set in accordance with a predetermined characteristics curve such that said ratio decreases as the density of said pixels becomes close to the base density of a negative image, said ratio increases as the density thereof becomes farther from said base density of the negative image, and said ratio continuously changes when said density is at the intermediate of said base density of said negative image.

6. A method for obtaining image data for outputting, by carrying out predetermined image processing of image data, comprising:
    obtaining light distribution characteristics of an electronic flash, corresponding to a photographing distance;
    determining the light distribution characteristics of the electronic flash, and computing a light amount adjusting amount of the image on the basis of said light distribution characteristics read; and
    correcting the image on the basis of the light amount adjusting amount which is computed by said computing means.

7. A method for obtaining image data for outputting, by carrying out predetermined image processing of image data, comprising:
    obtaining photographing information including light distribution characteristics of the electronic flash and the photographing distance of a camera;
    separating said image into a main subject image portion and a background image portion;
    computing determining the light distribution characteristics of the electronic flash corresponding to the photographing distance to each of the main subject image portion and the background image portion, which have been separated from each other, and computing a light amount adjusting amount of each of said main subject image portion and said background image portion on the basis of the light distribution characteristics thereof;
    correcting each of said main subject image portion and said background image portion on the basis of the light amount adjusting amount which has been computed; and
    combining said main subject image portion and said background image portion which have been corrected by said correcting means.

8. The method according to claim 2, further comprising: controlling the difference between densities of the contour of each of said main subject image portion and said background image portion when said main subject image portion and said background image portion are combined, to a predetermined value or less.

9. The method according to any one of claims 1 to 3, wherein the correcting step includes setting a ratio with which correction can be substantially carried out in accordance with a density for each pixel when the image is expressed as a plurality of pixels.

10. The method according to claim 4, wherein said ratio is set in accordance with a predetermined characteristics curve such that said ratio decreases as the density of said pixels becomes close to the base density of a negative image, said ratio increases as the density thereof becomes farther from said base density of the negative image, and said ratio continuously changes when said density is at the intermediate of said base density of said negative image.

* * * * *